United States Patent
Gomes (10) Patent No.: US 9,853,810 B1
(45) Date of Patent: Dec. 26, 2017

(54) MESSAGE PADDING FOR BIT-ORIENTED AND BIT-REVERSED INPUT MESSAGES

(71) Applicant: International Business Machines Corporation, Armonk, NY (US)

(72) Inventor: Louis P. Gomes, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/281,582

(22) Filed: Sep. 30, 2016

(51) Int. Cl.
*H04L 9/06* (2006.01)

(52) U.S. Cl.
CPC ................... *H04L 9/0643* (2013.01)

(58) Field of Classification Search
CPC ... H04L 9/0643; H04L 9/0687; H04L 9/0656; H04L 9/0816; H04L 9/0668
USPC ........................................................ 380/280
See application file for complete search history.

(56) References Cited

U.S. PATENT DOCUMENTS

| | | | | |
|---|---|---|---|---|
| 4,206,315 A * | 6/1980 | Matyas | .................... | H04L 9/088 340/5.8 |
| 6,069,954 A * | 5/2000 | Moreau | .................. | H04L 9/0668 380/268 |
| 7,146,500 B2 * | 12/2006 | Hawkins | .............. | G06Q 20/401 705/75 |
| 7,685,429 B2 * | 3/2010 | Suga | ...................... | H04L 9/3247 380/28 |
| 2013/0332743 A1 * | 12/2013 | Gueron | ..................... | G09C 1/00 713/189 |
| 2014/0019771 A1 | 1/2014 | Emmett et al. | | |
| 2015/0215114 A1 * | 7/2015 | Alahmad | .............. | H04L 9/0643 380/44 |

FOREIGN PATENT DOCUMENTS

SG        194203 A1    11/2013

OTHER PUBLICATIONS

Pardo, J., et al., "The SHA-3 Family of Cryptographic Hash Functions and Extendable-Output Functions," www.maplesoft.com/applications/download.aspx?SF=153903/SHA-3.pdf, 2015, 25 pages.

* cited by examiner

*Primary Examiner* — Abu Sholeman
(74) *Attorney, Agent, or Firm* — Cantor Colburn LLP; Steven Chiu (57) ABSTRACT

Systems, methods, and computer-readable media are disclosed for performing message padding of input messages in a manner that preserves the integrity of the input data regardless of whether the input message is in a bit-oriented format or a bit-reversed format. Each byte of a partial input message block of an input message may be converted from a bit-reversed format to a bit-oriented format prior to performing message padding in order to ensure that input data bits are not lost during the message padding. Subsequent to the message padding that generates one or more padded message blocks, the padded message block(s) may be converted from a bit-oriented format to a bit-reversed format to enable further processing of the input message to be performed to obtain a message digest.

14 Claims, 5 Drawing Sheets

MESSAGE PADDING FOR BIT-ORIENTED AND BIT-REVERSED INPUT MESSAGES

BACKGROUND

A hash function is a function that can be used to map data of an arbitrary size to data of a fixed size. The values returned by a hash function are typically referred to as hash values. A cryptographic hash function is a special class of hash functions that has certain properties that make it suitable for use in cryptography. In particular, a cryptographic hash function has the property of being a one-way function (i.e., a function which is infeasible to invert). Input data to a cryptographic hash function may be referred to as an input message and the output of the function may be referred to as a message digest.

The Secure Hash Algorithm (SHA) is a family of cryptographic hash functions published by the National Institute of Standards and Technology (NIST). Included among the SHA family of cryptographic hash functions are SHA-0, SHA-1, SHA-2, and SHA-3. The SHA hash functions differ in various aspects such as, for example, the size of the output in bits, the block size in bits, and so forth. Further, multiple variations of a particular SHA hash function may exist. For example, SHA3 has a number of different variations such as SHA3-256 and SHA3-512 which differ, among other things, in the size of the output that they generate.

SUMMARY

In one or more example embodiments of the disclosure, a method for performing message padding on an input message containing input data is disclosed. The method includes identifying a partial input message block of the input message, where the partial input message block contains at least a portion of the input data, and converting the partial input message block from a bit-reversed format to a bit-oriented format. Once the partial input message block is converted to the bit-oriented format, a number of one or more extra bits in a last populated byte of the partial input message block is determined, where the one or more extra bits do not contain any of the input data. The method further includes storing a zero value for each of the one or more extra bits in the last populated byte of the partial input message block, performing the message padding to generate one or more padded message blocks, and converting the one or more padded message blocks to the bit-reversed format.

In one or more other example embodiments of the disclosure, a system for performing message padding on an input message containing input data is disclosed. The system includes at least one memory storing computer-executable instructions and at least one processor configured to access the at least one memory and execute the computer-executable instructions to perform a set of operations. The operations include identifying a partial input message block of the input message, where the partial input message block contains at least a portion of the input data, and converting the partial input message block from a bit-reversed format to a bit-oriented format. Once the partial input message block is converted to the bit-oriented format, a number of one or more extra bits in a last populated byte of the partial input message block is determined, where the one or more extra bits do not contain any of the input data. The operations further include storing a zero value for each of the one or more extra bits in the last populated byte of the partial input message block, performing the message padding to generate one or more padded message blocks, and converting the one or more padded message blocks to the bit-reversed format.

In one or more other example embodiments of the disclosure, a computer program product for performing message padding on an input message containing input data is disclosed. The computer program product includes a non-transitory storage medium readable by a processing circuit, the storage medium storing instructions executable by the processing circuit to cause a method to be performed. The method includes identifying a partial input message block of the input message, where the partial input message block contains at least a portion of the input data, and converting the partial input message block from a bit-reversed format to a bit-oriented format. Once the partial input message block is converted to the bit-oriented format, a number of one or more extra bits in a last populated byte of the partial input message block is determined, where the one or more extra bits do not contain any of the input data. The method further includes storing a zero value for each of the one or more extra bits in the last populated byte of the partial input message block, performing the message padding to generate one or more padded message blocks, and converting the one or more padded message blocks to the bit-reversed format.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Example embodiments of the disclosure include, among other things, systems, methods, computer-readable media, techniques, and methodologies for performing message padding of input messages in a manner that preserves the integrity of the input data regardless of whether the input message is in a bit-oriented format or a bit-reversed format.

In particular, there exists a risk that input data bits are lost during conventional message padding when the bytes of an input message are in a bit-reversed format because input data bits in a last partially populated byte of the input message may occupy less significant positions in the byte than they would in a bit-oriented format, and thus, may be inadvertently truncated during message padding. Example embodiments of the disclosure eliminate this risk at least in part by converting an input message from a bit-reversed format to a bit-oriented format prior to performing message padding.

Figure 1:
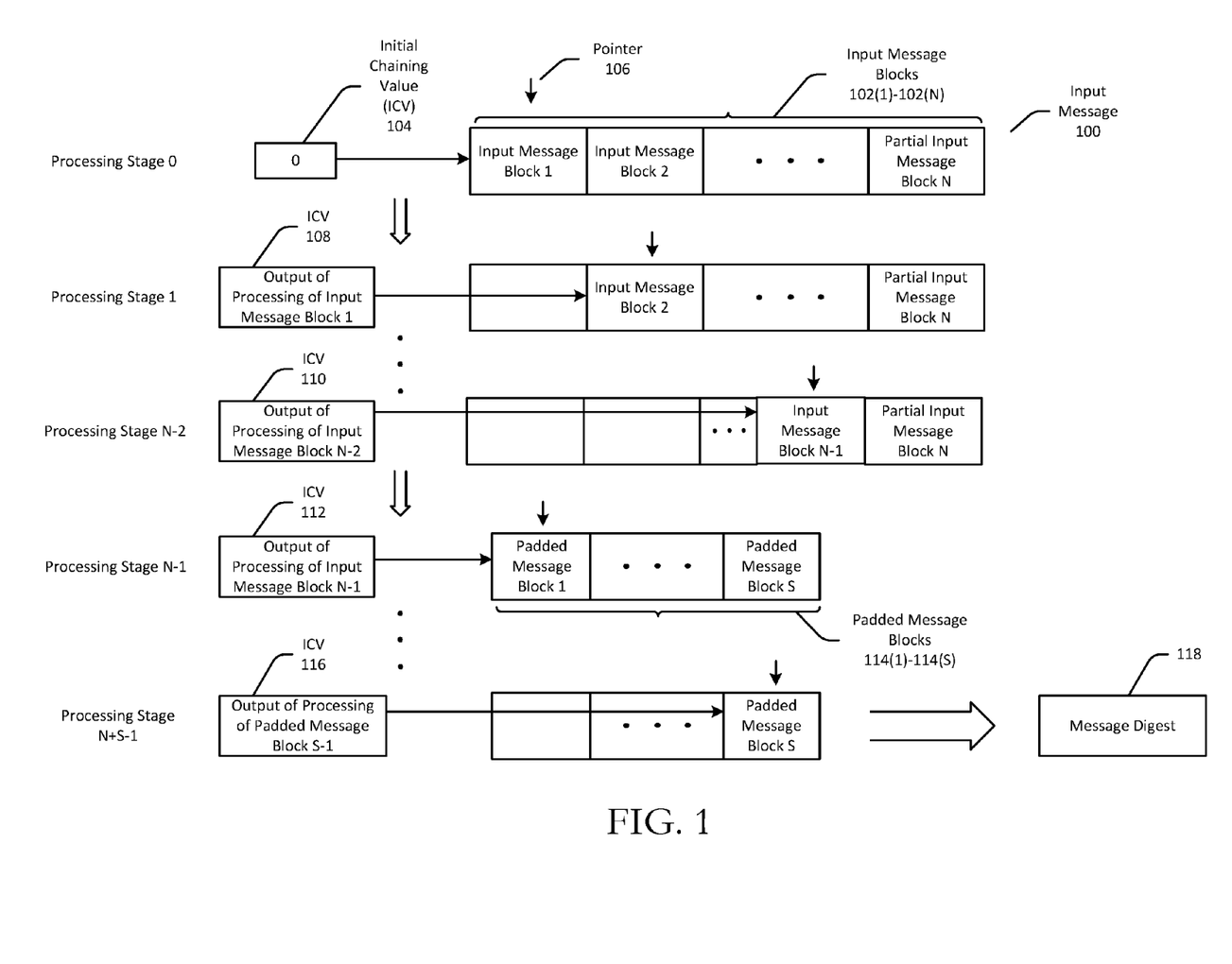
FIG. 1 is a schematic block diagram that provides a high-level overview of processing and message padding of an input message to obtain a message digest.

FIG. 1 is a schematic block diagram that provides a high-level overview of processing and message padding of an input message to obtain a message digest. FIG. 1 depicts an input message 100 that may contain input message blocks 102(1)-102(N). In certain example embodiments, each of the input message blocks 102(1)-102(N) may be populated with input data of the input message 100. Each of the input message blocks 102(1)-102(N) may have a size (i.e., a number of bytes available for storing input data) that is dependent on a function (e.g., cryptographic hash function) that will be used to process the input message 100. While the size of each input message block 102(1)-102(N) may vary based on the function, the size may be the same for a given function. For example, for a particular SHA-3 algorithm, each input message block 102(1)-102(N) may be 8 bytes in size.

Further, in certain example embodiments, a last input message block populated with input data (e.g., input message block 102(N)) may be a partial input message block that is only partially populated with input data. In particular, partial input message block 102(N) may contain one or more bytes that each include one or more bits that do not contain input data of the input message 100. For example, assuming again that the input message blocks of the input message 100 are 8 bytes in size, input message block 102(N) may be a partial input message block that may contain input data in only 3 of the 8 total bytes available in the input message block 102(N). Further, in certain example embodiments, a last populated byte in the partial input message block 102(N) may be only partially populated with input data. In particular, a last populated byte of the input message block 102(N) may contain one or more bits that are not populated with input data (such bit(s) may be referred to herein as extra bit(s)). For example, input message block 102(N) may be a partial input message block having a last populated byte that contains input data in only 4 of the 8 bits in the byte, in which case, the last populated byte would contain 4 extra bits.

It should be appreciated that the term last populated byte as used herein refers to a last populated byte of an input message block that is at least partially populated with input data, and does not necessarily correspond to a last available byte in an input message block. For example, the partial input message block 102(N) may contain 10 bytes available for storing input data, but byte 8 may be the last populated byte, in which case, bytes 9 and 10 do not contain any input data. It should further be appreciated that the number of input message blocks (N) in the input message 100 that contain input data is less than or equal to a total number of blocks available in the input message 100 for storing input data. In particular, in certain example embodiments, all of the input message blocks of the input message 100 may not store input data. For example, the input message 100 may contain 4 input message blocks available for storing input data, each of which is 8 bytes in size, but the input message may only contain input data in 2 of the 4 input message blocks. That is, each of the 8 bytes in 2 of the input message blocks may be populated with input data, but the other 2 input message blocks may contain no input data. In such a scenario, N would have a value of 2. Although not depicted in FIG. 1, even if N is less than the total number of available blocks, the input message 100 may not contain a partial input message block in those example embodiments in which the bytes of the input message block 102(N) are fully populated with input data.

In example embodiments of the disclosure, a hash function such as a cryptographic hash function may be applied to the input message 100 to generate a message digest 118. In a first processing stage (Processing Stage 0), an initial chaining value (ICV) 104 may be combined with input data in input message block 102(1) to generate a combined input that is then processed in accordance the selected hash function. A pointer 106 may be provided to indicate a current input message block to be processed. In certain example embodiments, the ICV 104 at Processing Stage 0 may be a zero value that is then XORed with the input data in the input message block 102(1) to obtain the combined input. Having a zero value for the ICV 104 at Processing Stage 0 ensures that the combined input generated from XORing the ICV 104 with the input data in the input message block 102(1) is identical to the input data.

The input data in the input message block 102(1) (i.e., the result of XORing the ICV 104 having a zero value with the input data in the input message block 102(1)) may then be processed, and an output of the processing may be stored as ICV 108. The pointer 106 may then be incremented to a next input message block to be processed. Then, in a next processing stage (Processing Stage 1), the ICV 108 may be combined (e.g., XORed) with the input data in the next input message block of the input message 100 (i.e., input message block 102(2)) to generate a combined input. This combined input may then be processed at Processing Stage 1 to generate an output that may be stored as an ICV to be used during a subsequent processing stage (e.g., Processing Stage 2). The processing may continue in this manner (with the pointer 106 being incremented to the next input message block after each processing stage) until Processing Stage N−2 is reached, at which point, the output of the processing of input message block 102(N−2) (which is stored as ICV 110) may be combined (e.g., XORed) with the input data in input message block 102(N−1) to generate an output that is stored as ICV 112.

Since input message block 102(N) is a partial input message block, message padding of the input message 100 may be performed after Processing State N−2 to append a padding signature to the input message 100. Message padding may include generating one or more padded message blocks 114(1)-114(S), where S is greater than or equal to 1. The padded message blocks 114(1)-114(S) may contain the padding signature which, in certain example embodiments, may be generated in accordance with the KECCAK message padding technique of the SHA-3 cryptographic hash function.

As previously noted, in certain example embodiments, input message block 102(N) is a partial input message block that contains one or more bytes that each contain one or more bits not populated with any input data. Further, a last populated byte of the partial input message block 102(N) may be only partially populated with input data. For example, the last populated byte of the partial input message block 102(N) may contain 5 bits of input data and 3 extra bits that do not contain input data. In such a scenario, initial bits of the padding signature may be stored in the extra bits of the last populated byte of the partial input message block 102(N). If additional byte(s) are available in the partial input message block 102(N) after the last populated byte, these additional byte(s) may be used to store additional bits of the padding signature.

In certain example embodiments, the number of available bytes/bits in the partial input message block 102(N) may be sufficient to store the entire padding signature, in which case, only a single padded message block may be generated. On the other hand, if the number of available bytes/bits in the partial input message block 102(N) is not sufficient to store the entire padding signature, one or more additional padded message blocks may be generated to store the remainder of the padding signature. In either scenario, the first padded message block that is generated (padded message block 114(1))—which may be the only padded message block that is generated—contains the input data of the partial input message block 102(N) as well as at least an initial portion of the padding signature.

Once the padded message blocks 114(1)-114(S) have been generated, processing may continue with Processing Stage N−1. At Processing Stage N−1, output of the processing of input message block N−1 stored as ICV 112 may be combined with the data in padded message block 114(1) to generate a combined input. This combined input may be processed to generate an output that may be stored as an ICV for use in a subsequent processing stage. This process may continue until the output of processing of padded message block S−1 (ICV 116) is combined with the data in padded message block S to generate a final combined input. This final combined input may then be processed to obtain the message digest 118.

Certain hash functions may require that the input message 100 be in a particular format prior to being able to process the input message 100. For example, one or more variations of the SHA-3 cryptographic hash function require that an input message be in a bit-reversed format. A bit-reversed format is one in which the respective bits of each byte of the input message are reversed, but the bytes themselves are in order. Thus, an input message that is bit-reversed is nonetheless byte-oriented, and thus, may be described as a hybrid format between a Big-Endian representation in which a most significant bit (MSB) appears first in a byte and a little-Endian representation in which a least significant bit (LSB) appears first in a byte.

Conventional message padding that is performed on a bit-reversed input message has the potential to compromise the integrity of the input data of the input message in at least those scenarios in which the input message includes a partial input message block. In particular, if the input message 100 is bit-reversed and the partial input message block 102(N) includes a last populated byte that is only partially populated with input data, then there is a potential that some input data bits in that last populated byte are lost when conventional message padding is performed. This is because the bits in that last populated byte would be ordered in accordance with a bit-reversed format such that input data bits appear in less significant positions in the byte than they would if the bits were ordered in accordance with a bit-oriented format. Because the last populated byte is known to be only partially populated, the LSB and potentially one or more additional bits may be truncated from the right of the last populated byte and replaced with padding signature bit(s) when the one or more padded message blocks 114(1)-114(S) are generated through message padding. These truncated bit(s) may include one or more input data bits because the last populated byte, and in fact the entire input message 100, is in a bit-reversed format.

Example embodiments of the disclosure address, among other things, the above-described drawback associated with conventional message padding techniques at least in part by converting each byte in the partial input message block 102(N) (including a last populated byte that may be only partially populated with input data) from a bit-reversed format to a bit-oriented format prior to initiating message padding operations. By doing so, input data bits present in the last populated byte of the partial input message block 102(N) are moved from less significant positions in the byte to more significant positions, and thus, the risk of losing those input data bits due to truncation of the last populated byte during message padding is eliminated. Once the one or more padded message blocks 114(1)-114(N) are generated through message padding, each byte in the padded message blocks may be converted back to the bit-reversed format to permit further processing of the input message 100 to be performed to obtain the message digest 118.

Figure 2A:
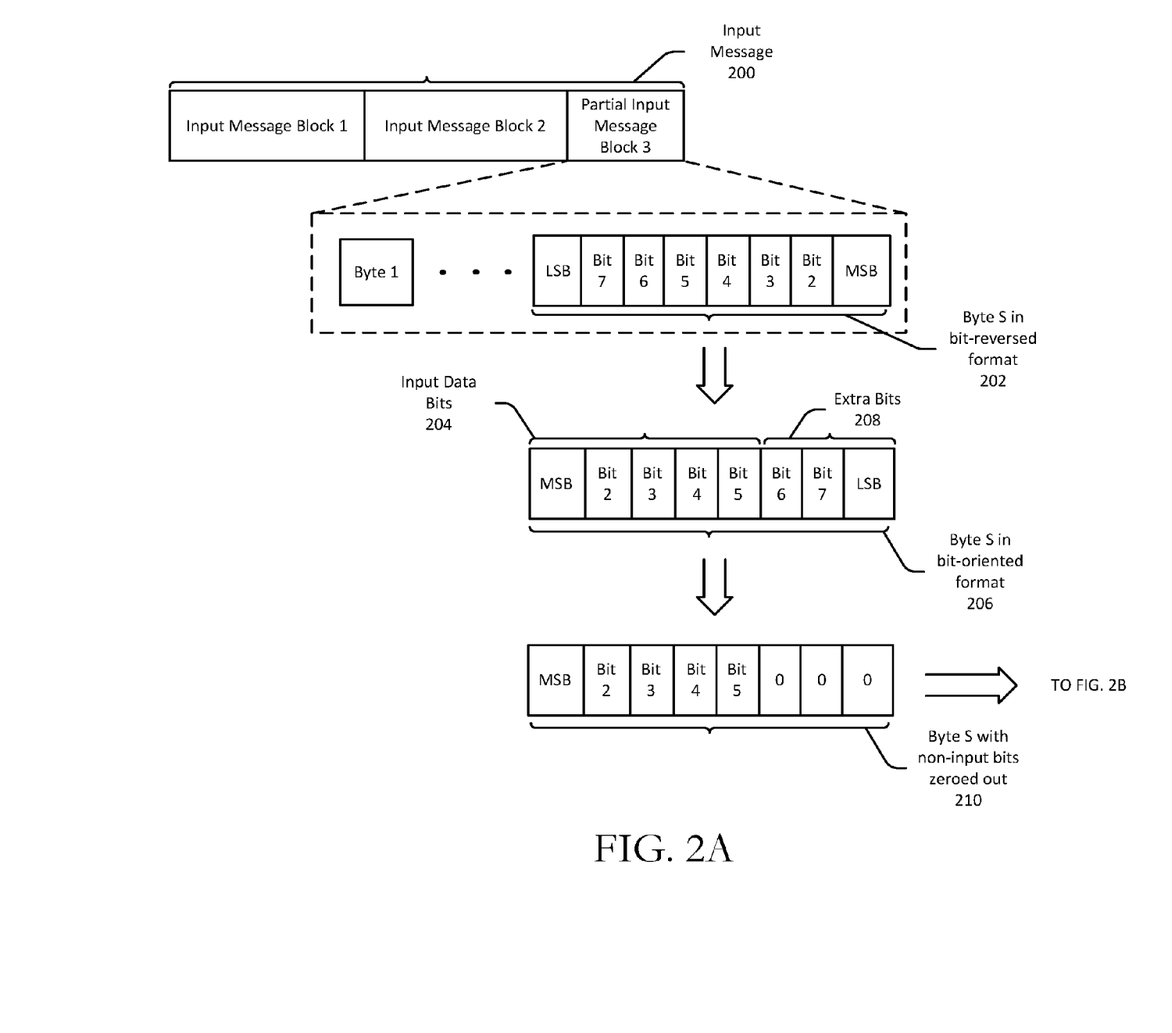
FIGS. 2A-2B are diagrams that schematically depict the illustrative method of FIG. 3 in accordance with one or more example embodiments of the disclosure.
Figure 2B:
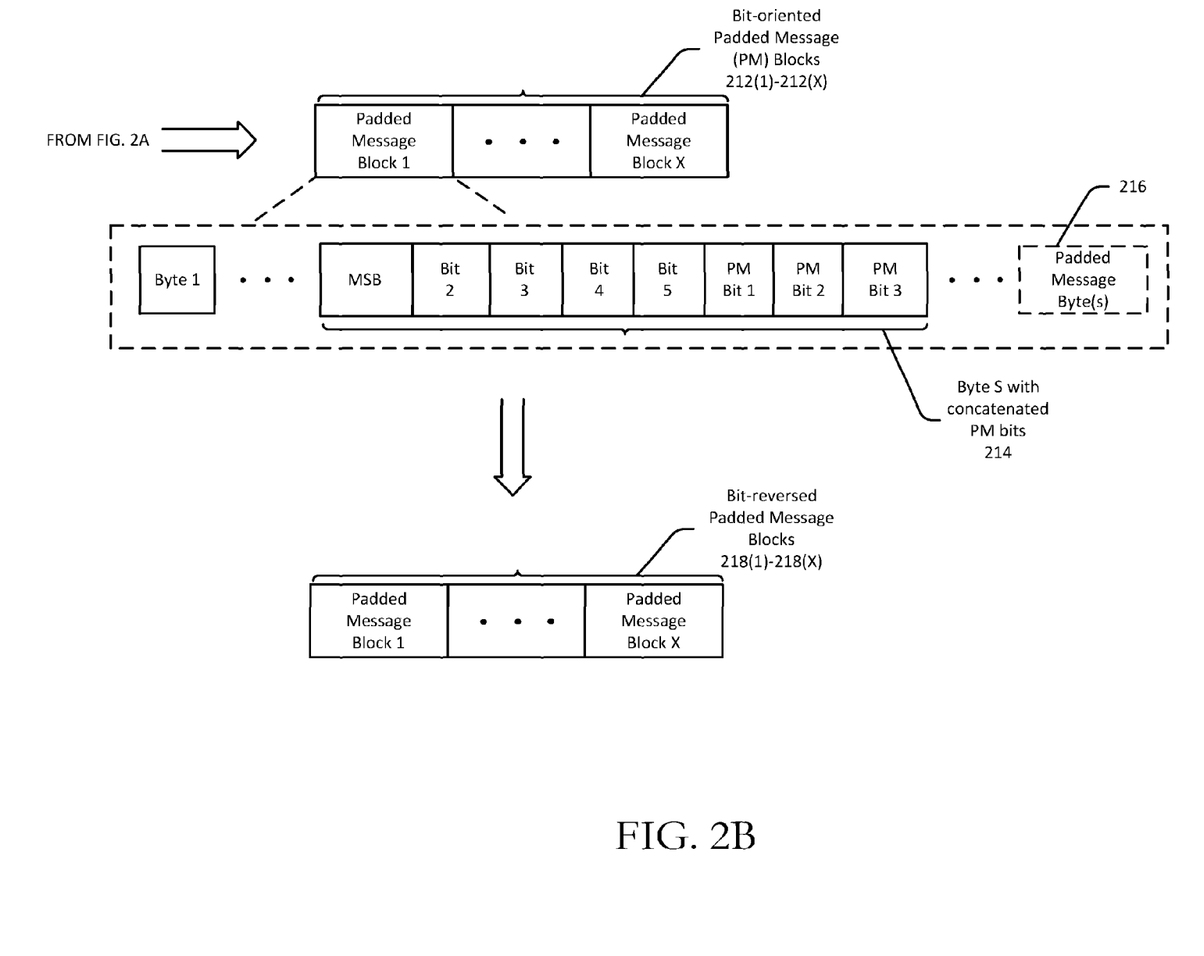
Figure 3:
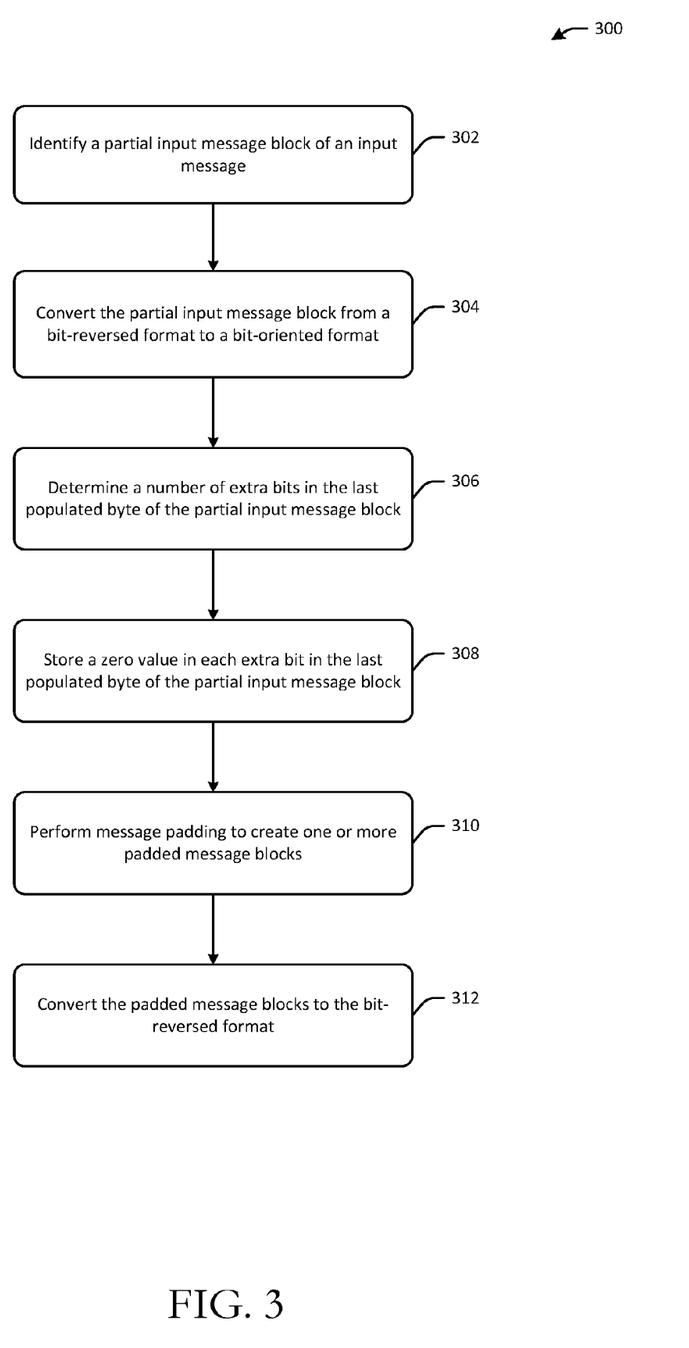
FIG. 3 is a process flow diagram of an illustrative method for performing message padding on a bit-reversed input message in accordance with one or more example embodiments of the disclosure.

FIGS. 2A-2B are diagrams that schematically depict the illustrative method of FIG. 3 in accordance with one or more example embodiments of the disclosure. FIG. 3 is a process flow diagram of an illustrative method 300 for performing message padding on a bit-reversed input message in accordance with one or more example embodiments of the disclosure. FIGS. 2A-2B and FIG. 3 will be described in conjunction with one another hereinafter.

Each operation of the method 300 may be performed by one or more of the program modules depicted in FIG. 4, whose operation will be described in more detail hereinafter. These program modules may be implemented in any combination of hardware, software, and/or firmware. In certain example embodiments, one or more of these program modules may be implemented, at least in part, as software and/or firmware modules that include computer-executable instructions that when executed by a processing circuit cause one or more operations to be performed. A system or device described herein as being configured to implement example embodiments of the disclosure may include one or more processing circuits, each of which may include one or more processing units or nodes. Computer-executable instructions may include computer-executable program code that when executed by a processing unit may cause input data contained in or referenced by the computer-executable program code to be accessed and processed to yield output data.

Referring now to FIG. 2A and FIG. 3 in conjunction with one another, at block 302 computer-executable instructions of one or more message padding module(s) may be executed to cause a partial input message block of an input message to be identified. FIG. 2A depicts an example input message 200 containing full input message blocks 1 and 2 and partial input message block 3. The input message 200 may be byte-oriented with the bytes of each input message block being in a Big-Endian order, but bit-reversed such that a respective set of bits in each byte are in a Little-Endian order. Each input message block of the input message 200 may be the same size. However, all bytes of the input message blocks 1 and 2 may be fully populated with input data, while one or more bytes of the partial input message block 3 may be only partially populated with input data and/or not populated with any input data. Further, in certain example embodiments, a last populated byte of the partial input message block 3 may be only partially populated with input data (e.g., the last populated byte may contain one or more extra bits).

At block 304, computer-executable instructions of one or more bit format conversion modules may be executed to convert the partial input message block 3 from a bit-reversed format to a bit-oriented format. More specifically, at block 304, each byte in the partial input message block 3 may be converted from a bit-reversed format to a bit-oriented format which, in effect, converts the entire partial input message block 3 to a full Big-Endian format.

For example, as shown in FIG. 2A, the partial input message block 3 may contain bytes 1 through S. Bytes 1 through S−1 may be fully populated with input data, while byte S may be only partially populated with input data. While byte S may be a last populated byte of the partial input message block 3, it should be appreciated that partial input message block 3 may further contain one or more additional bytes after byte S that contain no input data. Each byte in the partial input message block 3 (or more generally each byte in the input message 200) may be in a bit-reversed format.

Byte S in a bit-reversed format 202 is illustratively depicted in FIG. 2A. In particular, byte S in the bit-reversed format 202 corresponds to a Little-Endian representation of the bits in byte S where the LSB appears in a leftmost bit position in byte S and the MSB appears in a rightmost bit position in byte S. After conversion of each byte in the partial input message block 3 from a bit-reversed format to a bit-oriented format, a bit-oriented byte S 206 may be generated that corresponds to a Big-Endian representation of the bits in byte S where the MSB appears in leftmost bit position in byte S and the LSB appears in a rightmost bit position in byte S.

At block 306, computer-executable instructions of one or more partial input message block modification modules may be executed to determine a number of extra bits 208 in the last populated byte (i.e., byte S) of the partial input message block 3. For example, byte S may include 5 bits that are populated with input data (i.e., input data bits 204) and 3 extra bits 208 that do not contain input data.

Then, at block 308, computer-executable instructions of the partial input message block modification module(s) may be executed to store a zero value in each extra bit 208 in the last populated byte S of the partial input message block 3. As a result of the operation at block 308, byte S with the extra bits 208 zeroed out 210 may be generated.

Referring now to FIG. 2B in conjunction with FIG. 3, at block 310, computer-executable instructions of one or more message padding modules may be executed to perform message padding operations to generate one or more padded message block 212(1)-212(X). A first padded message block 212(1) may contain the input data from the partial input message block 3 as well as at least a portion of a padding signature appended to the input data. As part of the message padding performed at block 310, an initial portion of the padding signature may be stored in the extra bits 208 of byte S that were zeroed out.

In those example embodiments in which the first padded message block 212(1) is the only padded message block, the padded message block 212(1) may contain the input data from the partial input message block 3 as well as the entire padding signature. This may be the case in those example embodiments in which the partial input message block 3 contains a sufficient number of additional bytes after the last populated byte S to store the remainder of the padding signature after the initial portion of the padding signature that is stored in the zeroed out extra bits 208 of the last populated byte S. In other example embodiments, however, the partial input message block 3 may not contain a sufficient number of additional bytes for storing the remainder of the padding signature. In such a scenario, one or more additional padded message blocks may be generated to store the remainder of the padding signature. An additional portion of the padding signature stored in any available byte(s) of the partial input message block 3 after the last populated byte S are referenced as padded message byte(s) 216 in FIG. 2B.

Due at least in part to the conversion of the bytes of the partial input message block 3 from a bit-reversed format to a bit-oriented format, the byte of the padded message block(s) 212(1)-212(X) may also be in a bit-oriented format. As such, at block 312, computer-executable instructions of the bit format conversion module(s) may be executed to convert the padded message block(s) 212(1)-212(X) from a bit-oriented format to a bit-reversed format to generate bit-reversed padded message block(s) 218(1)-218(X).

After conversion to the bit-reversed format, the padded message block(s) 218(1)-218(X) can now be processed to obtain a message digest from the input message 200, as described earlier in reference to FIG. 1. The illustrative method 300 allows message padding to be performed on the input message 200 in a manner that preserves the integrity of the input data even when the input message 200 is in a bit-reversed format. In particular, prior to conversion to the bit-oriented format, the input data bits 204 of byte S 202 appear in rightmost bit positions of byte S 202, and thus, would be susceptible to being lost if message padding was to be performed on the bit-reversed byte S 202. However, because byte S is converted to a bit-oriented format at block 304 to generate byte S 206, the input data bits 204 instead appear in leftmost bit positions of byte S (e.g., more significant bit positions than the extra bits 208), and thus, the risk that the input data bits 204 are lost as a result of message padding operations that replace bits in a last populated byte with padding signature bits is eliminated.

Example embodiments of the disclosure provide various technical features, technical effects, and/or improvements to technology. For instance, example embodiments of the disclosure provide the technical effect of ensuring that message padding operations performed as part of the processing of an input message using, for example, a hash function, do not compromise the integrity of the input data in the input message. In particular, example embodiments of the disclosure provide the technical effect of ensuring that no input data bits of a bit-reversed input message are lost when message padding operations are performed. These technical effects are achieved at least in part by the technical feature of converting the bytes of a partial input message block of the input message from a bit-reversed format to a bit-oriented format prior to performing message padding. Example embodiments of the disclosure also provide the technical effect of ensuring that the input message is properly processed after the message padding is performed to obtain an accurate message digest. This technical effect is achieved at least in part by the technical feature of converting one or more padded message blocks generated as a result of message padding operations from the bit-oriented format to the bit-reversed format prior to continuing with processing of the input message. The above-mentioned technical effects individually and together constitute an improvement to the functioning of a computer, in particular, an improvement to the functioning of a computer that is executing processing of an input message that includes message padding operations. It should be appreciated that the above examples of technical features, technical effects, and improvements to the functioning of a computer and computer technology provided by example embodiments of the disclosure are merely illustrative and not exhaustive.

One or more illustrative embodiments of the disclosure are described herein. Such embodiments are merely illustrative of the scope of this disclosure and are not intended to be limiting in any way. Accordingly, variations, modifications, and equivalents of embodiments disclosed herein are also within the scope of this disclosure.

Figure 4:
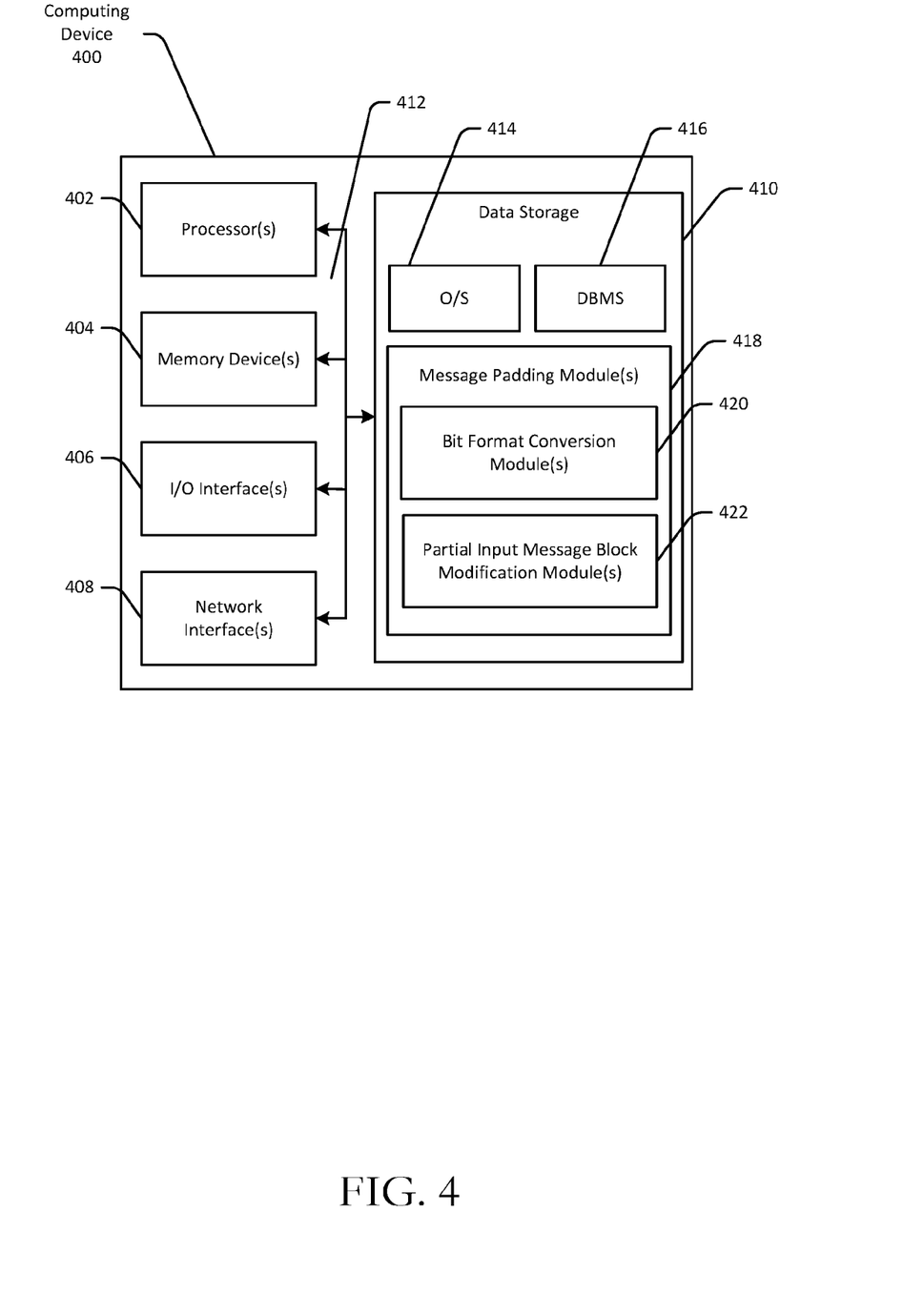
FIG. 4 is a schematic diagram of an illustrative computing device configured to implement one or more example embodiments of the disclosure.

FIG. 4 is a schematic diagram of an illustrative computing device 400 configured to implement one or more example embodiments of the disclosure. While the device 400 may be described herein in the singular, it should be appreciated that multiple instances of the device 400 may be provided, and functionality described in connection with the device 400 may be distributed across such multiple instances.

In an illustrative configuration, the device 400 may include one or more processors (processor(s)) 402, one or more memory devices 404 (generically referred to herein as memory 404), one or more input/output ("I/O") interface(s) 406, one or more network interfaces 408, and data storage 410. The device 400 may further include one or more buses 412 that functionally couple various components of the device 400.

The bus(es) 412 may include at least one of a system bus, a memory bus, an address bus, or a message bus, and may permit the exchange of information (e.g., data (including computer-executable code), signaling, etc.) between various components of the device 400. The bus(es) 412 may include, without limitation, a memory bus or a memory controller, a peripheral bus, an accelerated graphics port, and so forth. The bus(es) 412 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 404 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 404 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 404 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 410 may include removable storage and/or non-removable storage including, but not limited to, magnetic storage, optical disk storage, and/or tape storage. The data storage 410 may provide non-volatile storage of computer-executable instructions and other data. The memory 404 and the data storage 410, removable and/or non-removable, are examples of computer-readable storage media (CRSM) as that term is used herein.

The data storage 410 may store computer-executable code, instructions, or the like that may be loadable into the memory 404 and executable by the processor(s) 402 to cause the processor(s) 402 to perform or initiate various operations. The data storage 410 may additionally store data that may be copied to memory 404 for use by the processor(s) 402 during the execution of the computer-executable instructions. Moreover, output data generated as a result of execution of the computer-executable instructions by the processor(s) 402 may be stored initially in memory 404 and may ultimately be copied to data storage 410 for non-volatile storage.

More specifically, the data storage 410 may store one or more operating systems (O/S) 414; one or more database management systems (DBMS) 416 configured to access the memory 404 and/or one or more external data store(s) (not shown); and one or more program modules, applications, engines, computer-executable code, scripts, or the like such as, for example, one or more message padding modules 418. The message padding module(s) 418 may, in turn, include various sub-modules such as one or more bit conversion modules 420 and one or more partial input message block modification modules 422. Any of the components depicted as being stored in data storage 410 may include any combination of software, firmware, and/or hardware. The software and/or firmware may include computer-executable instructions (e.g., computer-executable program code) that may be loaded into the memory 404 for execution by one or more of the processor(s) 402 to perform any of the operations described earlier in connection with correspondingly named modules.

Although not depicted in FIG. 4, the data storage 410 may further store various types of data utilized by components of the device 400 (e.g., input message data, pointer data, output data from the processing of input message blocks of an input message, padding signature data, message digest data, etc.). Any data stored in the data storage 410 may be loaded into the memory 404 for use by the processor(s) 402 in executing computer-executable instructions. In addition, any data stored in the data storage 410 may potentially be stored in external data store(s) and may be accessed via the DBMS 416 and loaded in the memory 404 for use by the processor(s) 402 in executing computer-executable instructions.

The processor(s) 402 may be configured to access the memory 404 and execute computer-executable instructions loaded therein. For example, the processor(s) 402 may be configured to execute computer-executable instructions of the various program modules, applications, engines, or the like of the device 400 to cause or facilitate various operations to be performed in accordance with one or more embodiments of the disclosure. The processor(s) 402 may include any suitable processing unit capable of accepting data as input, processing the input data in accordance with stored computer-executable instructions, and generating output data. The processor(s) 402 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 402 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 402 may be capable of supporting any of a variety of instruction sets.

Referring now to other illustrative components depicted as being stored in the data storage 410, the O/S 414 may be loaded from the data storage 410 into the memory 404 and may provide an interface between other application software executing on the device 400 and hardware resources of the device 400. More specifically, the O/S 414 may include a set of computer-executable instructions for managing hardware resources of the device 400 and for providing common services to other application programs. In certain example embodiments, the O/S 414 may include or otherwise control execution of one or more of the program modules depicted as being stored in the data storage 410. The O/S 414 may include any operating system now known or which may be developed in the future including, but not limited to, any server operating system, any mainframe operating system, or any other proprietary or non-proprietary operating system.

The DBMS 416 may be loaded into the memory 404 and may support functionality for accessing, retrieving, storing, and/or manipulating data stored in the memory 404, data stored in the data storage 410, and/or data stored in external data store(s). The DBMS 416 may use any of a variety of database models (e.g., relational model, object model, etc.) and may support any of a variety of query languages. The DBMS 416 may access data represented in one or more data schemas and stored in any suitable data repository. External data store(s) that may be accessible by the device 400 via the DBMS 416 may include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the device 400, the input/output (I/O) interface(s) 406 may facilitate the receipt of input information by the device 400 from one or more I/O devices as well as the output of information from the device 400 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the device 400 or may be separate. The I/O devices may further include, for example, any number of peripheral devices such as data storage devices, printing devices, and so forth.

The I/O interface(s) 406 may also include an interface for an external peripheral device connection such as universal serial bus (USB), FireWire, Thunderbolt, Ethernet port or other connection protocol that may connect to one or more networks. The I/O interface(s) 406 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The device 400 may further include one or more network interfaces 408 via which the device 400 may communicate with any of a variety of other systems, platforms, networks, devices, and so forth. The network interface(s) 408 may enable communication, for example, with one or more other devices via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

It should be appreciated that the program modules depicted in FIG. 4 as being stored in the data storage 410 are merely illustrative and not exhaustive and that processing described as being supported by any particular module may alternatively be distributed across multiple modules, engines, or the like, or performed by a different module, engine, or the like. In addition, various program module(s), script(s), plug-in(s), Application Programming Interface(s) (API(s)), or any other suitable computer-executable code hosted locally on the device 400 and/or hosted on other computing device(s) accessible via one or more networks, may be provided to support functionality provided by the modules depicted in FIG. 4 and/or additional or alternate functionality. Further, functionality may be modularized in any suitable manner such that processing described as being performed by a particular module may be performed by a collection of any number of program modules, or functionality described as being supported by any particular module may be supported, at least in part, by another module. In addition, program modules that support the functionality described herein may be executable across any number of devices 400 in accordance with any suitable computing model such as, for example, a client-server model, a peer-to-peer model, and so forth. In addition, any of the functionality described as being supported by any of the modules depicted in FIG. 4 may be implemented, at least partially, in hardware and/or firmware across any number of devices.

It should further be appreciated that the device 400 may include alternate and/or additional hardware, software, or firmware components beyond those described or depicted without departing from the scope of the disclosure. More particularly, it should be appreciated that software, firmware, or hardware components depicted as forming part of the device 400 are merely illustrative and that some components may not be present or additional components may be provided in various embodiments. While various illustrative modules have been depicted and described as software modules stored in data storage 410, it should be appreciated that functionality described as being supported by the modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional program modules and/or engines not depicted may be present and may support at least a portion of the described functionality and/or additional functionality.

One or more operations of the method 300 may be performed by a device 400 having the illustrative configuration depicted in FIG. 4, or more specifically, by one or more program modules, engines, applications, or the like executable on such a device. It should be appreciated, however, that such operations may be implemented in connection with numerous other device configurations.

The operations described and depicted in the illustrative method of FIG. 3 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIG. 3 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular system, system component, device, or device component may be performed by any other system, device, or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for performing message padding on an electronic input message containing input data, the method comprising:
    identifying, by a computer processor, an electronic partial input message block of the electronic input message, the partial input message block containing at least a portion of the input data;
    converting, by the computer processor, the partial input message block from a bit-reversed format to a bit-oriented format, wherein converting the partial input message block from the bit-reversed format to the bit-oriented format comprises moving an input data bit from a least significant position in a last populated byte of the partial input message block to a most significant position in the last populated byte;
    determining, by the computer processor, a number of one or more extra bits in the last populated byte of the partial input message block, wherein the one or more extra bits do not contain any of the input data;
    storing, by the computer processor, a zero value for each of the one or more extra bits in the last populated byte of the partial input message block;
    performing, by the computer processor, the message padding to generate one or more padded message blocks, wherein performing the message padding to generate the one or more padded message blocks comprises:
    generating a first padded message block at least in part by storing a first portion of a padding signature in the one or more extra bits of the last populated byte of the partial input message block to generate a modified last populated byte and including the modified last populated byte in the first padded message block; and
    storing a second portion of the padding signature in a group of one or more available bytes in the first padded message block; and
    converting, by the computer processor, the one or more padded message blocks to the bit-reversed format.

2. The computer-implemented method of claim 1, wherein converting the partial input message block from the bit-reversed format to the bit-oriented format comprises:
    determining one or more bytes in the partial input message block containing the at least a portion of the input data, the one or more bytes including the last populated byte; and
    reversing an order of a respective set of bits of each of the one or more bytes to convert the partial input message block to a big-Endian format.

3. The computer-implemented method of claim 1, the partial input message block further comprising at least one additional byte, the last populated byte and the at least one additional byte together containing the at least a portion of the input data, the first padded message block further comprising the at least one additional byte.

4. The computer-implemented method of claim 1, wherein the padding signature comprises only the first portion and the second portion, and wherein the one or more padded message blocks comprise only the first padded message block.

5. The computer-implemented method of claim 1, wherein performing the message padding further comprises:
    determining that the group of one or more available bytes in the first padded message block is insufficient to store the second portion of the padding signature and a third portion of the padding signature;
    generating a second padded message block; and
    storing the third portion of the padding signature in the second padded message block.

6. A system for performing message padding on an electric input message containing input data, the system comprising:
    at least one memory storing computer-executable instructions; and
    at least one processor configured to access the at least one memory and execute the computer-executable instructions to:
    identify an electronic partial input message block of the electronic input message, the partial input message block containing at least a portion of the input data;
    convert the partial input message block from a bit-reversed format to a bit-oriented format, wherein converting the partial input message block from the bit-reversed format to the bit-oriented format comprise moving an input data bit from a least significant position in a last populated byte of the partial input message block to a most significant position in the last populated bye;

determine a number of one or more extra bits in a last populated byte of the partial input message block, wherein the one or more extra bits do not contain any of the input data;

store a zero value for each of the one or more extra bits in the last populated byte of the partial input message block;

perform the message padding to generate one or more padded message blocks; and wherein the at least one processor is configured to perform the message padding to generate the one or more padded message blocks by executing the computer—executable instructions to:

generate a first padded message block at least in part by storing a first portion of a padding signature in the one or more extra bits of the last populated byte of the partial input message block to generate a modified last populated byte and including the modified last populated byte in the first padded message block; and store a second portion of the padding signature in a group of one or more available bytes in the first padded message block; and convert the one or more padded message blocks to the bit-reversed format.

7. The system of claim 6, wherein the at least one processor is configured to convert the partial input message block from the bit-reversed format to the bit-oriented format by executing the computer-executable instructions to:

determine one or more bytes in the partial input message block containing the at least a portion of the input data, the one or more bytes including the last populated byte; and reverse an order of a respective set of bits of each of the one or more bytes to convert the partial input message block to a big-Endian format.

8. The system of claim 6, the partial input message block further comprising at least one additional byte, the last populated byte and the at least one additional byte together containing the at least a portion of the input data, the first padded message block further comprising the at least one additional byte.

9. The system of claim 6, wherein the padding signature comprises only the first portion and the second portion, and wherein the one or more padded message blocks comprise only the first padded message block.

10. The system of claim 6, wherein the at least one processor is further configured to perform the message padding by executing the computer-executable instructions to:

determine that the group of one or more available bytes in the first padded message block is insufficient to store the second portion of the padding signature and a third portion of the padding signature;

generate a second padded message block; and store the third portion of the padding signature in the second padded message block.

11. A computer program product for preforming message padding on an electronic input message containing input data, the computer program product comprising a non-transitory storage medium readable by a processing circuit, the non-transitory storage medium storing instructions executable by the processing circuit to cause a method to be performed, the method comprising:

identifying an electronic input message block of the electronic input message, the partial input message block containing at least a portion of the input data;

converting the partial input message block form a bit-reversed format to a bit-oriented format, wherein converting the partial input message block from the bit-reversed format to the bit-oriented format comprise moving an input data bit from a least significant position in a last populated byte of the partial input message block to a most significant position in the last populated byte;

determining a number of one or more extra bits in a last populated byte of the partial input message block, wherein the one or more extra bits in the last populated byte of the partial input message block;

performing the message padding to generate one or more padded message blocks, wherein performing the message padding to generate the one or more padded message blocks comprise:

generating a first padded message block at least in part by storing a first portion of padding signature in the one or more extra bits of the last populated byte of the partial input message block to generate a modified last populated byte and including the modified last populated byte in the first padded message block; and storing a second portion of the padding signature in a group of one or more available bytes in the first padded message block; and converting the one or more padded message blocks to the bit-reversed format.

12. The computer program product of claim 11, wherein converting the partial input message block from the bit-reversed format to the bit-oriented format comprises:

determining one or more bytes in the partial input message block containing the at least a portion of the input data, the one or more bytes including the last populated byte; and reversing an order of a respective set of bits of each of the one or more bytes to convert the partial input message block to a big-Endian format.

13. The computer program product of claim 11, the partial input message block further comprising at least one additional byte, the last populated byte and the at least one additional byte together containing the at least a portion of the input data, the first padded message block further comprising the at least one additional byte.

14. The computer program product of claim 11, wherein performing the message padding further comprises:

determining that the group of one or more available bytes in the first padded message block is insufficient to store the second portion of the padding signature and a third portion of the padding signature;

generating a second padded message block; and storing the third portion of the padding signature in the second padded message block.

\* \* \* \* \*